UNITED STATES PATENT OFFICE.

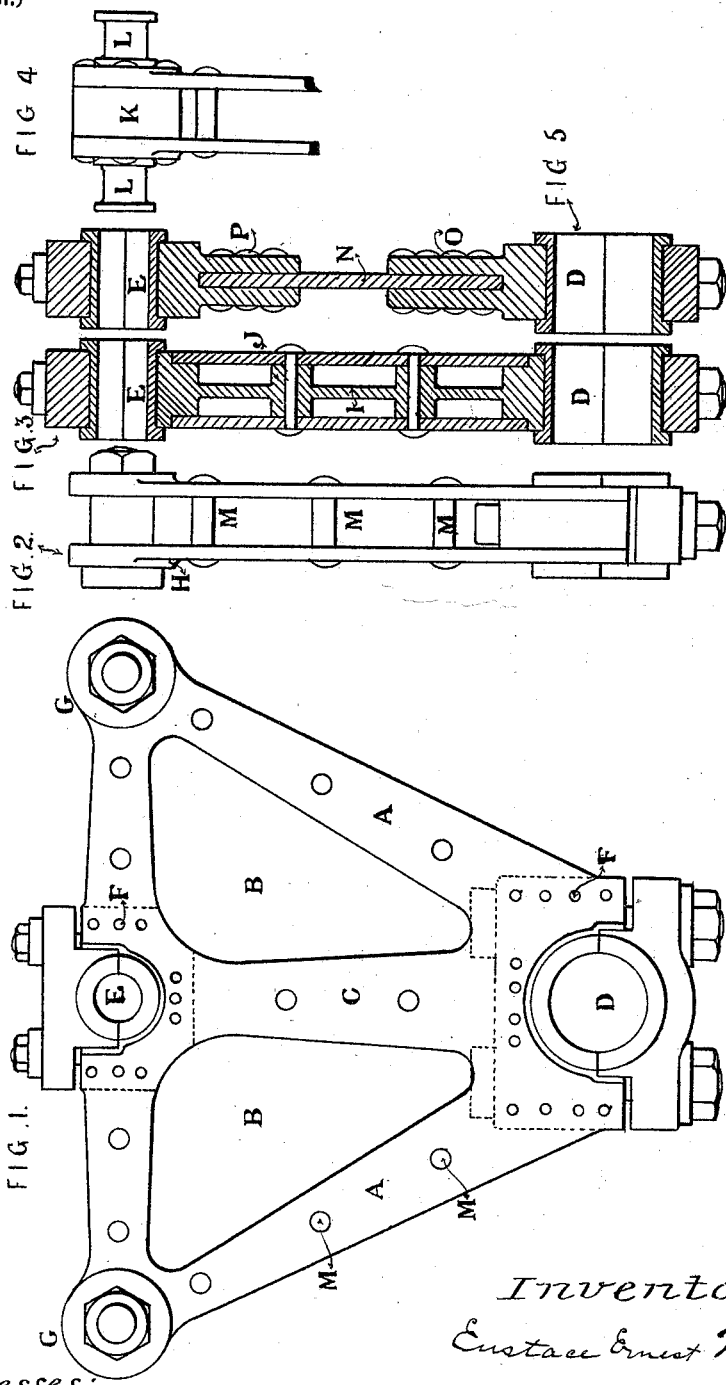

EUSTACE ERNEST WIGZELL, OF LONDON, ENGLAND.

CONNECTING-ROD.

SPECIFICATION forming part of Letters Patent No. 624,593, dated May 9, 1899.

Application filed December 19, 1898. Serial No. 699,702. (No model.)

*To all whom it may concern:*

Be it known that I, EUSTACE ERNEST WIGZELL, engineer of Billiter House, Billiter street, London, a subject of Her Majesty the Queen of Great Britain and Ireland, and a resident of Albion Cottage, High road, Loughton, London, in the county of Essex, England, have invented a new and useful Improvement in the Construction of Connecting-Rods for Steam-Engines, of which the following is a specification.

My improved connecting-rod is designed more particularly for use in steam-engines in which there are two pistons in each cylinder working in opposite directions to each other, such pistons working in connection with a three-throw crank-shaft, as patented to me under Letters Patent No. 554,966 of 1896, and I construct it in the following manner:

I have two iron or steel plates cut preferably triangular-shaped and lightened as much as possible by taking out the inner portion, but leaving a center web. At the bottom points of these triangular-shaped pieces I place a bearing made of cast iron or steel or any other suitable metal, the triangular-shaped pieces being riveted or bolted one on each side of the bearing, the bearing being furnished with a cap and bolts to make it adjustable on the crank-pin. The other two points of the triangular pieces I thicken by riveting or welding on strengthening-pieces to receive pins to join the two plates together, these pins being used for receiving the connecting rods or links for connecting to other parts of the mechanism; or should the connecting rod or rods be placed outside the triangular-shaped pieces I can use a distance-plug made of iron or steel or other suitable metal and riveted or bolted in position with pins projecting outward on each side to form journals for bearings. In the center, between the two outer points referred to above and directly over the bearing first referred to for the crank-pin, I have another cast iron or steel or other suitable metal bearing or bearings riveted or bolted in between the two triangular pieces for receiving the cross-head or pin from the guide-blocks, this bearing also being furnished with a top cap or caps and bolts to make it adjustable. The block forming the bottom bearing for the crank-pin and the block forming the top bearing for the cross-head or pin from the guide-blocks can be made in one, with a web or arm joining same together, this web or arm coming in between the two outside triangular pieces. This would enable the top and bottom bearings to be finished before the two outside triangular-shaped pieces were riveted or bolted on each side. In between the parts of the sheets forming the arms of the triangle I have distant pieces riveted or bolted through, as desired. A connecting-rod built in this manner is specially adapted for large powers, as it combines great strength with lightness.

Instead of using two triangular-shaped plates or pieces I can use one only, if desired, the bearings being riveted or bolted to this single triangular-shaped piece.

It must be understood also that although the description herein and the drawings attached hereto refer more particularly to triangular-shaped plates or pieces, this being the most convenient form, I do not confine myself exclusively to this shape. Any shape found most suitable or desirable may be adopted; but in any case if a line were drawn from the crank center to the two outer working centers and between these two centers it would form a triangle.

In the drawings annexed hereto, Figure 1 shows a front view, and Fig. 2 an end view, of my improved connecting-rod. Fig. 3 shows a section through the two center iron, steel, or other metal bearings with a connecting arm or web; and Fig. 4, one of the ends with a block in between the two plates with outer journals. Fig. 5 shows a section through the center bearings in cases where one plate only is used.

In the drawings like parts are marked with like letters.

The outer wrought iron or steel or other metal triangular-shaped plates are shown at A, with holes for lightening same at B B, leaving a center web C. The bottom bearing for the crank-pin is shown at D, and the top bearing for the cross-head or pin from the guide-blocks E with rivets or bolts, as at F F, for fastening the two triangular-shaped pieces on each side of these bearings. The two outer ends of the triangle are shown at G G, these ends being shown in Fig. 2 with strengthening-pieces H riveted on for taking the pins for joining the two plates together and for receiving the connecting-rods.

In Fig. 3, I is the connecting arm or web, joining the two middle bearings D and E together, this web or arm having a distance-piece J.

Fig. 4 shows the two outer ends with a block K and pins L L projecting on each side for forming journals. The distance-pieces placed at suitable intervals in between the two plates or pieces are marked M.

Fig. 5 shows a single sheet only, N, instead of two, as in the other drawings, D and E being the two center bearings, these bearings being riveted on, as at O P.

Having thus described the said matter, I claim as my invention and desire to patent in this specification—

1. A connecting-rod for engines of substantially triangular form, having bearing-blocks D, E, with adjustable caps, the two connecting-points G, G, and the plate connecting the bearings and the connecting-points and riveted to the bearing-blocks, substantially as described.

2. In combination, bearings D, E, arranged centrally, one over the other, the connecting-points G and the two plates attached to the bearing-blocks and having distance-pieces between them, substantially as described.

3. In combination, the bearings D and E, the connecting-bearings G, G, the intermediate web I connecting the bearings and the pair of plates one on each side of the web secured thereto and to the bearings, substantially as described.

EUSTACE ERNEST WIGZELL.

Witnesses:
J. T. DAVIS,
HENRY NEWTON.